(No Model.) 2 Sheets—Sheet 1.
R. CHILLINGWORTH.
MEANS FOR MANUFACTURING WHEEL HUBS.
No. 606,046. Patented June 21, 1898.
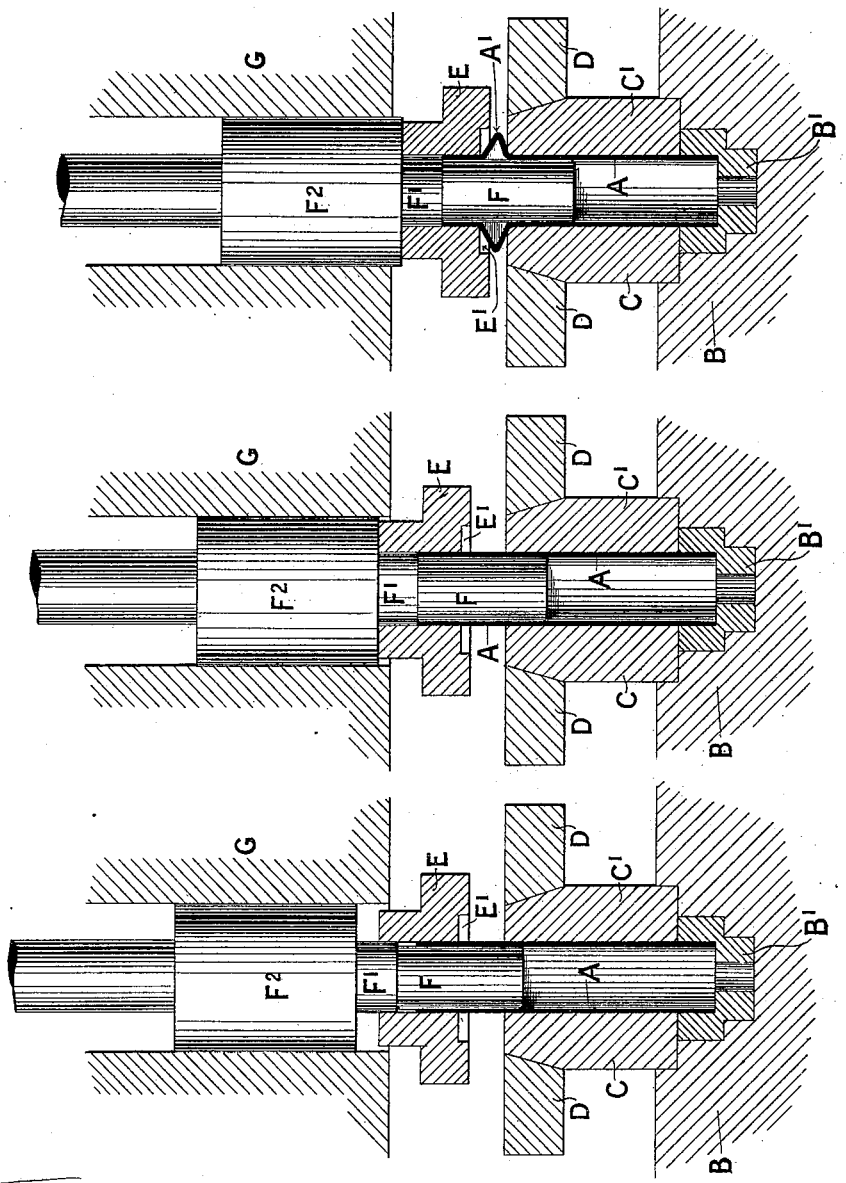
Witnesses
Chas. H. Smith
J. Staib
Inventor
R. Chillingworth
by L. W. Serrell & Son
Attys (No Model.) 2 Sheets—Sheet 2.
R. CHILLINGWORTH.
MEANS FOR MANUFACTURING WHEEL HUBS.
No. 606,046. Patented June 21, 1898.
FIG. 6.
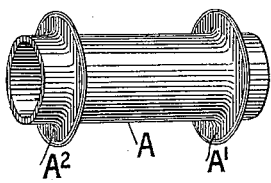
FIG. 4. FIG. 5.
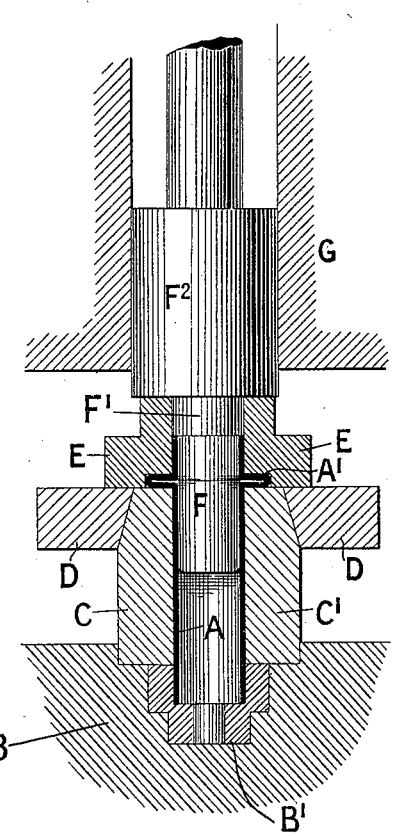 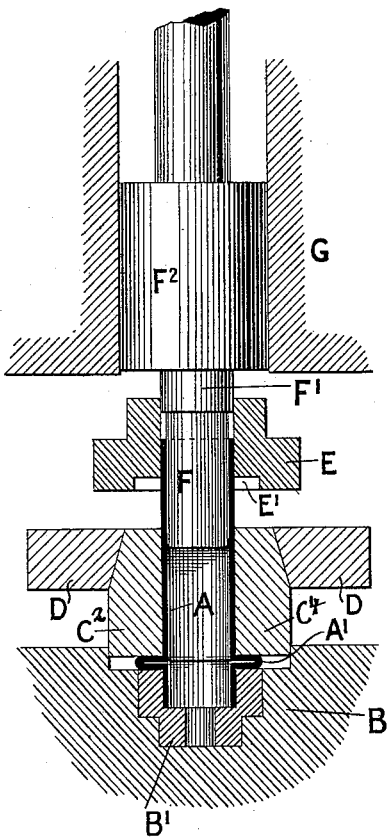

UNITED STATES PATENT OFFICE.

RUDOLF CHILLINGWORTH, OF NUREMBERG, GERMANY, ASSIGNOR TO THE STANDARD WELDLESS TUBE AND CYCLE COMPONENTS, LIMITED, OF LONDON, ENGLAND.

MEANS FOR MANUFACTURING WHEEL-HUBS.

SPECIFICATION forming part of Letters Patent No. 606,046, dated June 21, 1898.

Application filed May 27, 1897. Serial No. 638,368. (No model.) Patented in England December 15, 1896, No. 28,695.

*To all whom it may concern:*

Be it known that I, RUDOLF CHILLINGWORTH, a subject of the Emperor of Germany, residing at Nuremberg, Germany, have invented an Improvement in Means for Manufacturing Wheel-Hubs, (for which I have obtained a patent in Great Britain, No. 28,695, bearing date December 15, 1896,) of which the following is a specification.

The present invention relates to apparatus for manufacturing hubs for velocipedes and other wheels from one piece of tubing, such hub having two circular projecting flanges, one near each end, the central and end portions of the tube being maintained of the original diameter or nearly so.

In the drawings, Figure 1 is a vertical section of the dies and an elevation of the plungers or dies with the tube to be acted upon in section. Fig. 2 is a similar vertical section with the parts in position for commencing to expand one of the flanges. Fig. 3 is a similar view showing one flange as partially formed. Fig. 4 represents the parts in the position they assume with one flange completed. Fig. 5 is a similar section with the parts in position for forming the second flange, and Fig. 6 is a perspective view of the hub complete.

A suitable bed or table B is recessed to receive a die or ferrule B', that is movable and adapted to receive one end of the tube A, from which the hub is to be made, and the bed B is also recessed to receive the lower ends of the longitudinally-divided cylinder forming the two-part casing C C', which is of a size to set closely around the tube A, and the upper end of the casing C' is tapering, so that the parts are held together by the ring D, which is pressed down upon the upper end of such casing. A plunger is made use of, having the larger part F² in guides G, and suitable power is made use of to raise and force down this plunger, and the part F' is of a diameter corresponding to the exterior diameter of the tube A, and the part F is of a size to fit within the tube A, and the ring-die E corresponds in internal diameter to the exterior of the tube A, and it is recessed at E' to correspond to the flange A' or A² of the tubular hub.

In making a hub the tube A in a heated condition is inserted with the lower end in the die B and the casing C C' around it, and the plunger is brought down, so that the portion F passes inside the tube, and the ring-die E surrounds the upper end of such tube, and the lower end of the portion F' of the plunger comes against the end of the tube, and the upper end of the ring-die E is pressed upon by the portion F² of the plunger, and as the plunger is forced down the unsupported portion of the tube A is spread outward, as indicated in Fig. 3, in the formation of an annular flange, and when the parts are brought into the position shown in Fig. 4 the annular flange A' is completed. The plunger F² and ring-die E are now drawn up and separated from the tube A, the ring D separated from the casing C C', and such casing is lifted away from the partially-formed hub, and the tube A is inverted, with the other end in the die B', as seen in Fig. 5. A shorter casing C² C⁴ is now placed around the partially-formed hub and secured by the ring D, and the plunger is brought down again to form the second flange between the upper end of the casing C² C⁴ and the ring-die E in the same manner as before described, so as to form the second annular flange A². (Shown in Fig. 6.) The ring D is now removed and the two-part casing C² C⁴ separated from the hub, which is now complete and in a condition for use.

In consequence of retaining the lower end of the casing C' or C² C⁴ in the recess of the bed B and of securing the upper tapering end of the casing by the ring D the casing supports the tube and forms a die at its upper end acting in conjunction with the ring-die E in the formation of the flange, and the casing is easily and rapidly separated either from the partially-formed hub, Fig. 4, or the completely-formed hub, Fig. 6.

It is to be understood that the tube may be reheated between the formation of one flange and the other, if necessary.

I claim as my invention—

1. The recessed bed B and the die or ferrule B' adapted to receive the end of the tube that is to be flanged, the two-part casing C C' received at its lower end into a recess in the bed, the ring D having a tapering opening and fitting the upper part of the two-part casing, the plunger having a portion F' corresponding to the exterior of the tube and a portion F fitting the interior of the tube, and the ring-die E surrounding the upper end of the tube and the plunger and having an annular recess E' in its under surface into which the tube is expanded in a folded condition to form a flange, substantially as set forth.

2. The bed B and the die B' received into a recess in the bed, in combination with the two-part casing $C^2 C^4$ passing at its lower end into a recess in the bed B and of a length adapted to set between the two flanges of the tubular hub, the ring D having a tapering opening and holding the upper ends of the two-part casing $C^2 C^4$ together, a plunger having a portion F' corresponding to the exterior diameter of the tube to be acted upon, and the portion F to pass into such tube, and the ring-die E having an annular recess in its under surface adapted to the formation of a second flange upon the tubular hub, substantially as set forth.

RUDOLF CHILLINGWORTH.

Witnesses:
E. G. BREWER,
W. A. MARSHALL.